United States Patent
Lim

(10) Patent No.: US 10,093,418 B2
(45) Date of Patent: Oct. 9, 2018

(54) UNMANNED AERIAL VEHICLE

(71) Applicant: UVIFY CO., LTD., Seoul (KR)

(72) Inventor: Hyon Lim, Seoul (KR)

(73) Assignee: UVIFY CO., LTD., Seoul (KR)

( * ) Notice: Subject to any disclaimer, the term of this patent is extended or adjusted under 35 U.S.C. 154(b) by 0 days.

(21) Appl. No.: 15/684,622

(22) Filed: Aug. 23, 2017

(65) Prior Publication Data

US 2018/0022451 A1  Jan. 25, 2018

Related U.S. Application Data

(63) Continuation of application No. PCT/KR2017/005512, filed on May 26, 2017.

(60) Provisional application No. 62/441,169, filed on Dec. 31, 2016.

(30) Foreign Application Priority Data

May 27, 2016  (KR) .................. 10-2016-0065571
May 24, 2017  (KR) .................. 10-2017-0064384

(51) Int. Cl.
| | | |
|---|---|---|
| *B64C 27/08* | (2006.01) | |
| *B64C 39/02* | (2006.01) | |
| *G08C 17/02* | (2006.01) | |

(52) U.S. Cl.
CPC ............ *B64C 39/024* (2013.01); *B64C 27/08* (2013.01); *G08C 17/02* (2013.01); *B64C 2201/042* (2013.01); *B64C 2201/108* (2013.01); *B64C 2201/126* (2013.01); *B64C 2201/127* (2013.01); *B64C 2211/00* (2013.01)

(58) Field of Classification Search
CPC ............... B64C 39/024; B64C 39/028; B64C 2201/027; B64C 2201/042; B64C 2201/108; B64C 2211/00
See application file for complete search history.

(56) References Cited

U.S. PATENT DOCUMENTS

| | | |
|---|---|---|
| 2014/0037278 A1 | 2/2014 | Wang |
| 2014/0061376 A1 | 3/2014 | Fisher et al. |
| 2014/0099853 A1* | 4/2014 | Condon ............... G05D 1/0033 446/37 |
| 2015/0060606 A1* | 3/2015 | Wang .................... B64C 39/024 244/175 |
| 2015/0158392 A1 | 6/2015 | Zhao |
| 2015/0336670 A1 | 11/2015 | Zhang |

(Continued)

FOREIGN PATENT DOCUMENTS

| | | |
|---|---|---|
| CN | 204223178 U | 3/2015 |
| CN | 204979215 U | 1/2016 |
| WO | 2014059549 A1 | 4/2014 |

OTHER PUBLICATIONS

DJI, Phantom 3 Quick Start Guide, V1.0, http://www.dji.com/product/phantom-3-standard.

Primary Examiner — Richard G Davis
(74) Attorney, Agent, or Firm — Dinsmore & Shohl LLP

(57) ABSTRACT

An unmanned aerial vehicle includes a plurality of arm units, each having a rotary wing, a motor, and an arm main body and detachably coupled to a main body; the main body having a plurality of receptacles for coupling to the arm units; and a battery unit detachably coupled to the main body to be exposed to outside, in which at least a part of the battery unit is exposed to outside when the battery unit is coupled to the main body.

14 Claims, 20 Drawing Sheets

(56) References Cited

U.S. PATENT DOCUMENTS

| | | |
|---|---|---|
| 2016/0032895 A1 | 2/2016 | Wedeendorf et al. |
| 2016/0122016 A1 | 5/2016 | Mintchev et al. |
| 2016/0137306 A1* | 5/2016 | Ji .......................... B64C 27/08 244/54 |
| 2016/0144954 A1 | 5/2016 | Daigle |
| 2016/0221676 A1 | 8/2016 | Fisher et al. |
| 2017/0015418 A1* | 1/2017 | Matus ................... B64C 39/024 |
| 2017/0136901 A1* | 5/2017 | Zhao .................... B60L 11/1822 |
| 2017/0247113 A1* | 8/2017 | Sanlaville ............... B64C 27/08 |
| 2017/0256763 A1* | 9/2017 | Qiu ...................... H01M 2/1083 |
| 2017/0297703 A1* | 10/2017 | Thelen .................. B64D 31/06 |
| 2017/0338455 A1* | 11/2017 | Qiu ...................... B64C 39/024 |

\* cited by examiner

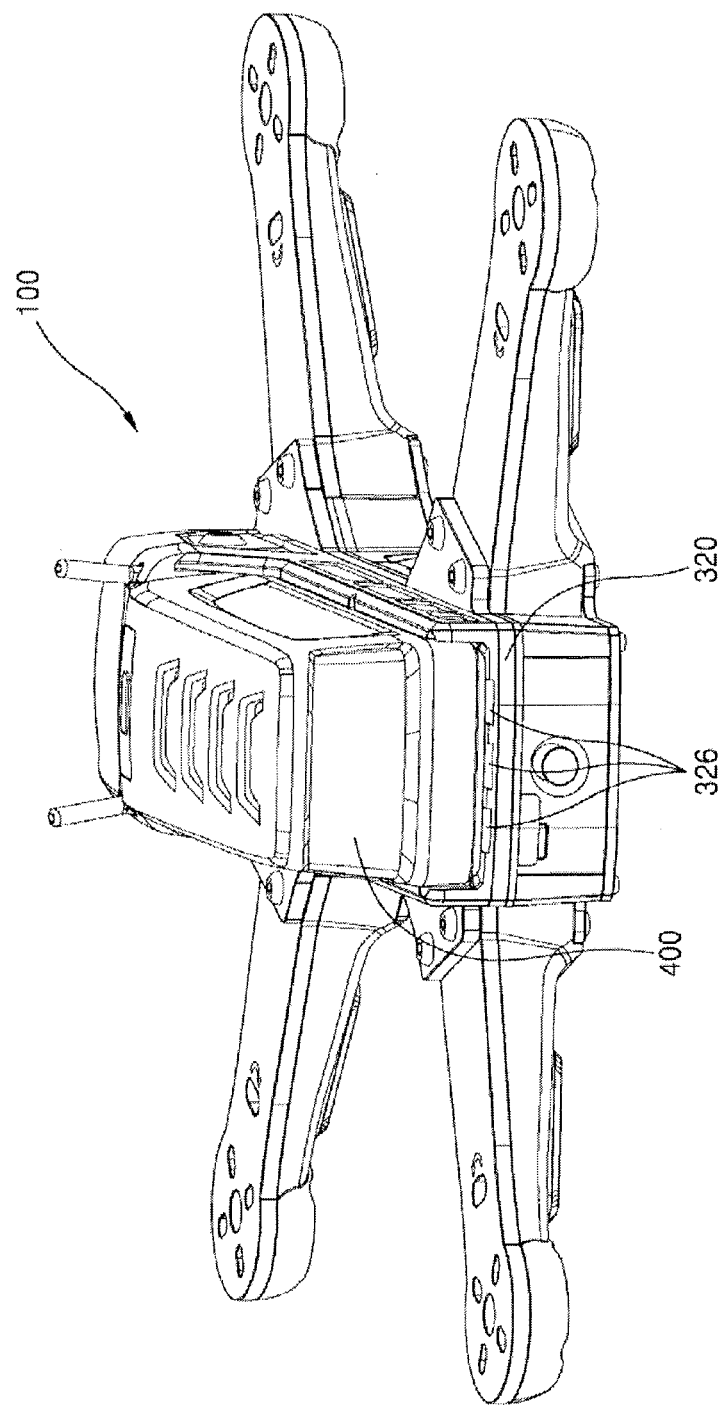

US 10,093,418 B2

UNMANNED AERIAL VEHICLE

CROSS-REFERENCE TO RELATED APPLICATIONS

This application is a continuation application of Patent Cooperation Treaty (PCT) international application Serial No. PCT/KR2017/005512, filed on May 26, 2017, and which designates the United States, which claims priority to Korean Patent Application Serial No. 10-2016-0065571, filed on May 27, 2016 and Korean Patent Application Serial No. 10-2017-0064384, filed on May 24, 2017, and claims the benefit of U.S. Provisional Application No. 62/441,169, filed on Dec. 31, 2016. The entire contents of the above applications are hereby incorporated by reference.

TECHNICAL FIELD

The present disclosure relates to an unmanned aerial vehicle, and more particularly, to an unmanned aerial vehicle having a detachable arm.

BACKGROUND ART

Unmanned aerial vehicles (UAVs) that are called drones mean flying objects manufactured to fly by radio wave induction without a pilot on board and to carry out a designated mission. Various equipment such as optical devices, infrared devices, or radar sensors according to the fields of applications may be mounted on the UAV to carry out missions such as surveillance, reconnaissance, communication/information broadcasting, etc.

An unmanned aerial vehicle may generally include an arm part where a propeller is installed and a body part. The propeller or the arm part may be easily damaged during the flight due to the characteristics of the arm part where the propeller is installed.

Recently, a drone racing game for racing with a plurality of drones draws attention. Referring to FIG. 1, in a drone racing game, a racing rail 10 is installed or a preset racing course is prepared. After various obstacles 20 are installed, a plurality of racing drones 30, 40, 50, and 60 participating in the game fly along the racing rail 10 by safely passing through the obstacles 20. Since the racing drones 30, 40, 50, and 60 need to not only fly at fast speed along the racing rail 10, but also rapidly pass through the obstacles 20 installed everywhere, the racing drones 30, 40, 50, and 60 may be easily damaged or broken by bumping the obstacles 20.

For drones, in particular, racing drones, various variables may causes damage during racing, repairing damaged drones may not be easy even when it is a minor damage, and much time is generally spent for maintenance.

SUMMARY

The present inventive concept provides an unmanned aerial vehicle having detachable constituent elements that are easy to replace when damaged.

According to an aspect of the present inventive concept, there is provided a unmanned aerial vehicle having an arm unit that is detachable According to the embodiment of the present inventive concept, even when a rotary wing, a battery, a motor, or an arm is damaged, a damaged part may be easily replaced without disassembly or soldering.

In the unmanned aerial vehicles according to various embodiments, since the arm unit is configured to be detachable from the main body, when the arm unit is damaged or broken due to falling or an external shock, the arm unit may be replaced or may be replaced with an upgraded arm unit later.

In the unmanned aerial vehicles according to various embodiments, since a batter unit is provided to be detachable from the main body, a clamping structure is provided in each of the main body and the battery unit to clamp each other, the battery unit may be firmly clamped to the main body and may be replaced smoothly, easily, and rapidly.

In the unmanned aerial vehicles according to various embodiments, when the main body except for the arm unit and the battery unit is damaged or broken, or is to be upgraded, only the main body may be replaced.

DESCRIPTION OF THE DRAWINGS

FIG. 18 illustrates a rear side of the main body of the unmanned aerial vehicle to which the battery unit is coupled.

DETAILED DESCRIPTION

Figure 1:
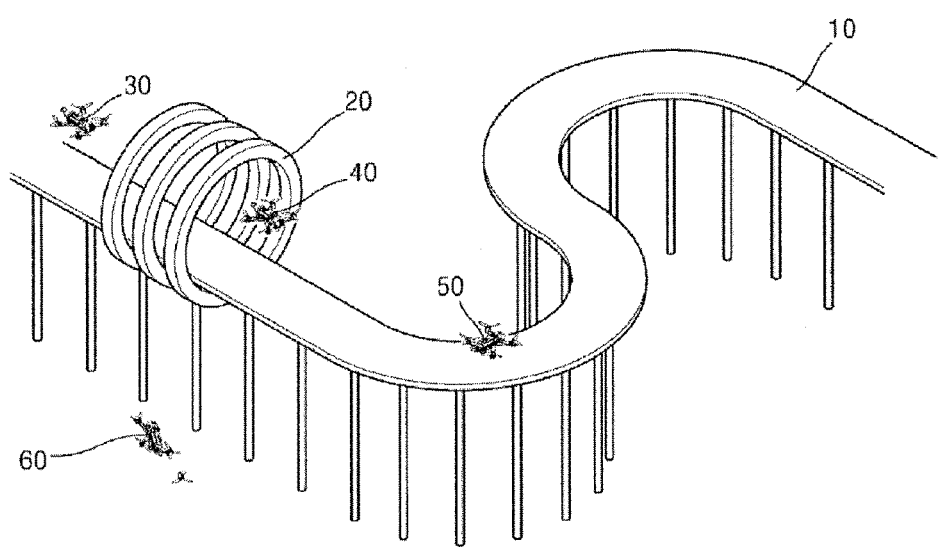
FIG. 1 illustrates an example of a racing drone game installation structure.

According to one aspect of the present inventive concept, an unmanned aerial vehicle includes a plurality of arm units, each of the plurality of arm units including a rotary wing, a motor, and an arm main body and detachably coupled to a main body; the main body including a plurality of receptacles for coupling to the plurality of arm units; and a battery unit detachably coupled to the main body to be exposed to outside, wherein at least a part of the battery unit is exposed to outside when the battery unit is coupled to the main body.

The arm main body may include an arm lower cover transceiving a signal with respect to the main body and having a connector installed thereon and transferring the signal to a motor control member; the motor control member installed on the arm lower cover and controlling a speed of the motor; and an arm upper cover coupled to the arm lower cover where the motor control member is installed, wherein the motor and the rotary wing are installed on the arm upper cover.

The arm upper cover may be formed of a material having heat conductivity over a certain standard for heat dissipation of the motor control member.

The battery unit may include a battery and a battery case. The battery case may include a clamping slot, the main body may include a clamping bar that is coupled to the clamping slot, and when the main body and the battery case are coupled to each other, the clamping slot and the clamping bar may be coupled to each other.

An input button for connection between the unmanned aerial vehicle and an external controlling device may be installed in a part of the main body that is not exposed to outside when the main body and the battery unit are coupled to each other.

A camera installation member for installing a camera may be provided on the main body, and the camera installation member may include a plurality of holes to adjust an installation angle of the camera.

The battery case may include one or more air inlet holes through which outside air passes, and the battery may include one or more ventilation slits through which air coming through the air inlet holes passes.

According to another aspect of the present inventive concept, an unmanned aerial vehicle includes a plurality of arm units, each of the plurality of arm units including a rotary wing, a motor, and an arm main body; a main body coupled to the plurality of arm units; and a battery unit detachably coupled to the main body such that at least a part of the battery unit is exposed to outside, in which the battery unit includes a battery and a battery case having at least one air inlet hole in the at least part exposed to the outside.

The battery may include two or more battery cells, and a ventilation slit may be provided between the battery cells to pass air coming through the at least one air inlet hole provided in the battery case.

The battery case may include a case housing having the at least one air inlet hole; and a case bottom having at least one ventilation hole for discharging the air passing through the at least one air inlet hole and the ventilation slit of the battery to outside of the battery case.

A ventilation manifold having one or more paths, through which air passing through the ventilation hole provided in the case bottom is discharged to outside of the unmanned aerial vehicle, may be provided on a surface of the main body contacting the case bottom when the battery unit is coupled to the main body.

Hereinafter, exemplary embodiments according to the present inventive concept are described in detail with reference to the accompanying drawings. Furthermore, a method of configuring and using an electronic apparatus according to an embodiment of the present inventive concept is described in detail with reference to the accompanying drawings. Throughout the detailed description section of the present inventive concept, like reference numerals denote like constituent elements.

Terms such as "first" and "second" are used herein merely to describe a variety of constituent elements, but the constituent elements are not limited by the terms. Such terms are used only for the purpose of distinguishing one constituent element from another constituent element. For example, without departing from the right scope of the present inventive concept, a first constituent element may be referred to as a second constituent element, and vice versa.

The term "and/or" includes any and all combinations of one or more of the associated listed items.

The terminology used herein is for the purpose of describing particular embodiments only and is not intended to limit embodiments. As used herein, the singular forms "a," "an" and "the" are intended to include the plural forms as well, unless the context clearly indicates otherwise. It will be further understood that terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Embodiments are described with reference to the accompanying drawings.

Figure 2:
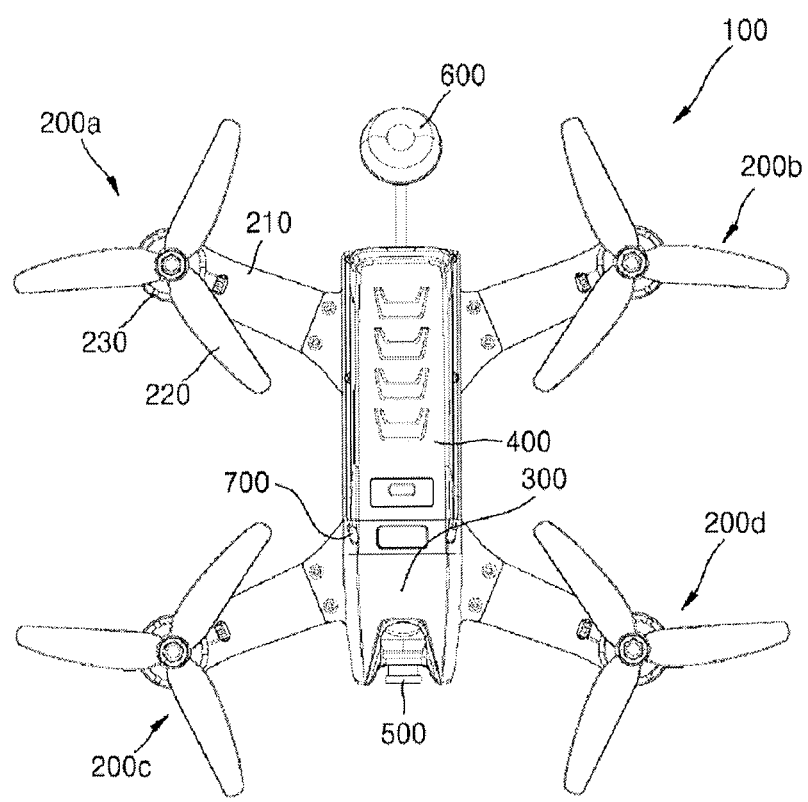
FIG. 2 is a plan view of an unmanned aerial vehicle according to an embodiment.

FIG. 2 is a plan view of an unmanned aerial vehicle 100 according to an embodiment.

Referring to FIG. 2, the unmanned aerial vehicle 100 according to an embodiment may include a main body 300, a plurality of arm units 200 detachably coupled to the main body 300, and a battery unit 400 detachably coupled to the main body 300.

The main body 300 serves as a main frame on which constituent elements of the unmanned aerial vehicle 100 are fixedly installed. The main body 300 may have any shape if it enables easy and firm installation of the constituent elements.

Figure 3:
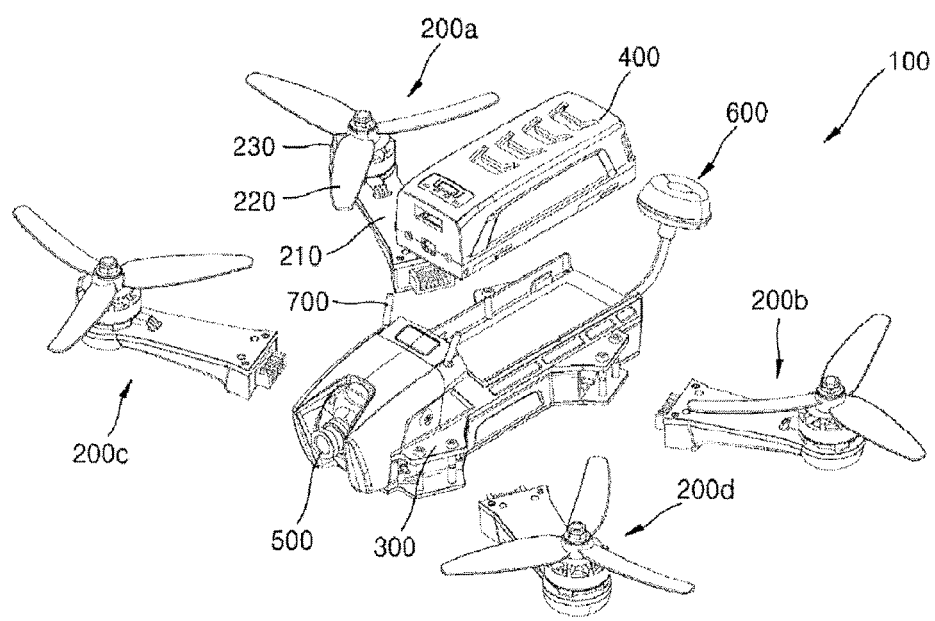
FIG. 3 is a perspective view of an unmanned aerial vehicle according to an embodiment.

A camera unit 500 and a lighting unit may be installed in a front part of the main body 300, and an antenna 600 may be installed in a rear part thereof. The camera unit 500 may capture images during the flight of the unmanned aerial vehicle 100. The antenna 600 installed at the rear part may transmit signals of the images captured by the camera unit 500 to a remote control device. Referring to FIG. 3, another antenna 700 may be further installed in a middle part of the main body 300, and the antenna 700 may be used for transceiving control signals with respect to the remote control device.

The arm units 200 may include arm units 200a to 200d. Each of the arm units 200 may include an arm main body 210, a rotary wing 220, and a motor 230.

The battery unit 400 is detachably coupled to the main body 300 to be exposed to the outside.

FIG. 3 is a perspective view of the unmanned aerial vehicle 100 according to an embodiment.

Referring to FIG. 3, in the unmanned aerial vehicle 100 according to an embodiment, since the arm units 200 and the battery unit 400 are all detachably coupled to the main body 300, the unmanned aerial vehicle 100 may be separated into the main body 300, the battery unit 400, and the arm units 200.

As such, in the unmanned aerial vehicle 100 according to the present embodiment, each of the arm units 200 is configured to be detachable from the main body 300, when the arm unit 200 is damaged or broken due to falling or an external shock, only the arm unit 200 needs to be replaced and may be also replaced with an upgraded arm unit 200 later.

Furthermore, since the unmanned aerial vehicle 100 according to an embodiment may include the battery unit 400 configured to be detachable from the main body 300, and a clamping structure to clamp the main body 300 and the battery unit 400 to each other, the battery unit 400 may be firmly clamped to the main body 300, and the battery unit 400 may be smoothly, easily, and rapidly replaced.

Furthermore, in the unmanned aerial vehicle 100 according to an embodiment, when the main body 300 is damaged or broken or needs to be upgraded, only the main body 300 may be replaced.

Although the configuration of the unmanned aerial vehicle 100 according to an embodiment may be applied to unmanned aerial vehicles for any purpose, the configuration may be particularly effective on racing drones in which constituent elements thereof are relatively easily damaged.

Figure 4:
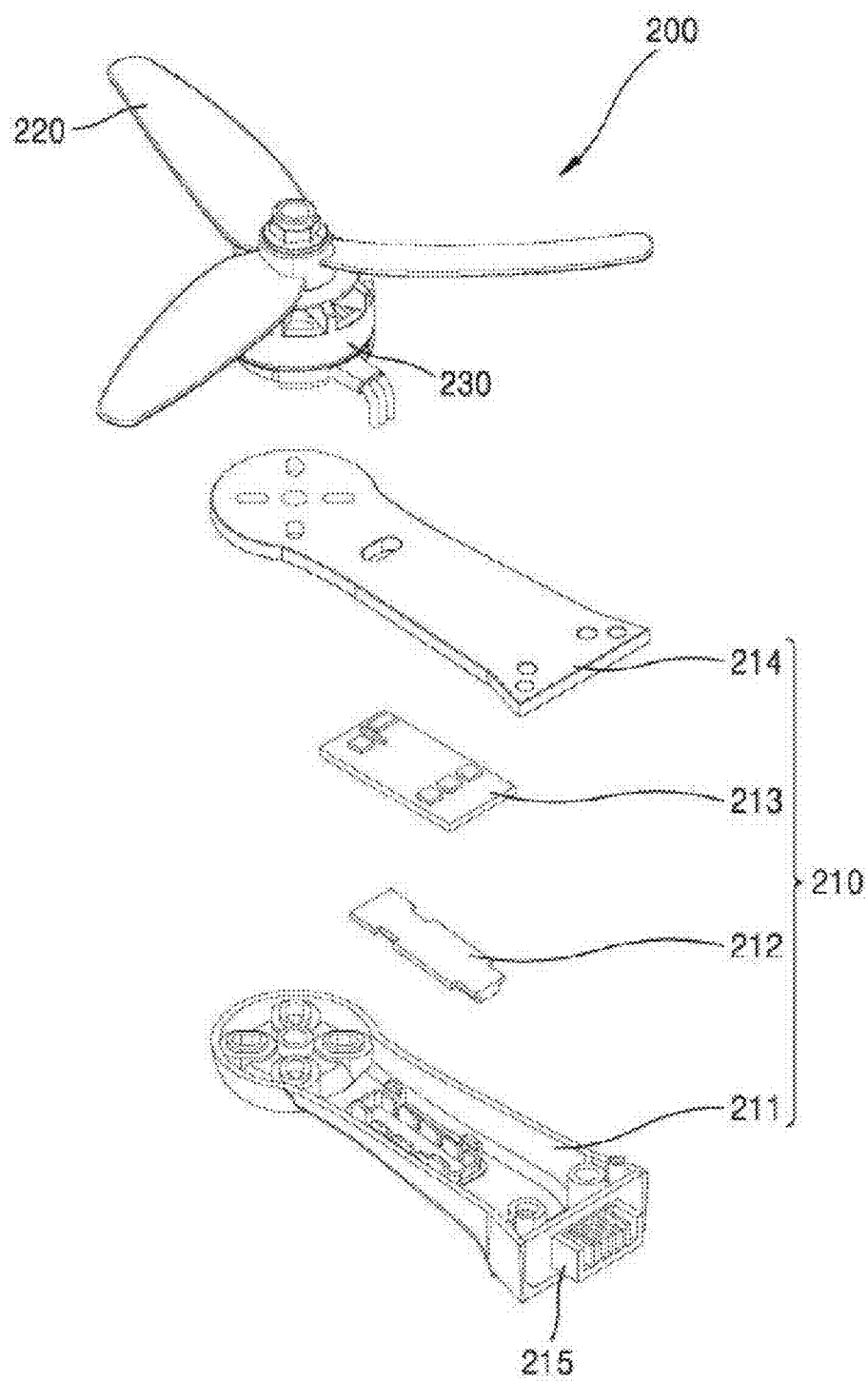
FIG. 4 is an exploded view of an arm unit according to an embodiment.

FIG. 4 is an exploded view of the arm unit 200 according to an embodiment.

Referring to FIG. 4, the arm unit 200 may include the arm main body 210, the motor 230, and the rotary wing 220.

The arm main body 210 is a bar-shaped member having a certain length. The motor 230 is installed at an end portion of the arm main body 210. The rotary wing 220 is installed at the motor 230 and rotated thereby.

However, the shape of the arm main body 210 is not limited to the above bar shape, and may have any shape if the arm main body 210 can function as an arm.

The arm main body 210 may include an arm upper cover 214 and an arm lower cover 211 coupled to each other between an LED PCB 212 and a motor control member 213.

The LED PCB 212 may include a circuit for controlling an LED installed at the arm unit 200.

The motor control member 213 is installed between the arm upper cover 214 and the arm lower cover 211, and may include a circuit for controlling a speed of the motor 230.

A connector 215 having a plurality of pins for transceiving signals with respect to the arm main body 210 and transferring signals to the motor control member 213 may be installed at one end of the arm lower cover 211.

According to an embodiment, the arm upper cover 214 may protect the motor control member 213 and enable the arm main body 210 to be maintained in a structurally firm state.

According to an embodiment, the arm upper cover 214 is formed of a material having high heat conductivity and may have a heat dissipation function to cool the motor control member 213. When the unmanned aerial vehicle 100 flies, the motor 230 receives electric energy from the motor control member 213 and performs a rotational motion, during which heat is generated from the motor control member 213. If the generated heat is not discharged, operational performance of the motor control member 213 may be deteriorated. Thus, in order to discharge the heat, a hole is formed in a case around a motor control member in an unmanned aerial vehicle according to the related art. However, there is a problem in that foreign materials come into a drone through the hole. According to the present embodiment, since the arm upper cover 214 of the unmanned aerial vehicle 100 formed of a material having high heat conductivity may serve as a heat dissipation plate, the heat generated from the motor control member 213 may be discharged to the outside without having any exposed hole.

During the flight of the unmanned aerial vehicle 100, as the motor control member 213 is continuously cooled by an air flow generated by the rotary wing 220, the unmanned aerial vehicle 100 may have an effective structure to discharge the heat of the motor control member 213.

Figure 5A:
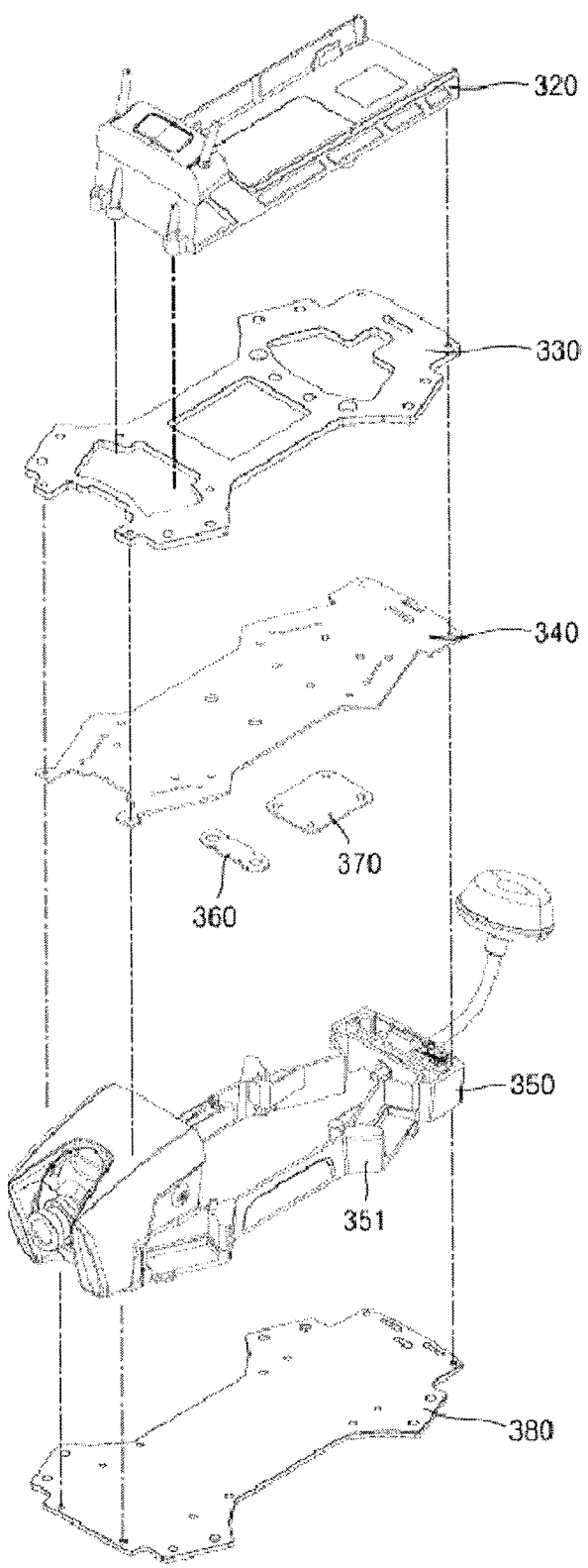
FIG. 5A is an exploded view of a main body according to an embodiment.

FIG. 5A is an exploded view of the main control member 340 according to an embodiment.

Referring to FIG. 5A, the main body 300 may include a battery detachable bracket 320, a carbon plate 330, a main control member 340, an IMU sensor board 360, a central operating board 370, a main body frame 350, and a main body lower carbon cover 380.

The battery detachable bracket 320 is to detachably fix the battery unit 400 to the carbon plate 330 of the main body 300, and is installed above the carbon plate 330.

The carbon plate 330 may perform a heat dissipation function to cool the battery unit 400

The main control member 340 is firmly installed on an upper portion of the main body frame 350. The main control member 340 may include a circuit unit for receiving signals transmitted from the remote control device and controlling power of the battery unit 400, thereby controlling the flight of the unmanned aerial vehicle 100. Furthermore, the main control member 340 may include a receptacle R located at an edge part of the main control member 340. When the arm unit 200 is connected to the main body 300, a plug terminal P of the arm unit 200 is inserted into the receptacle R.

Figure 5B:
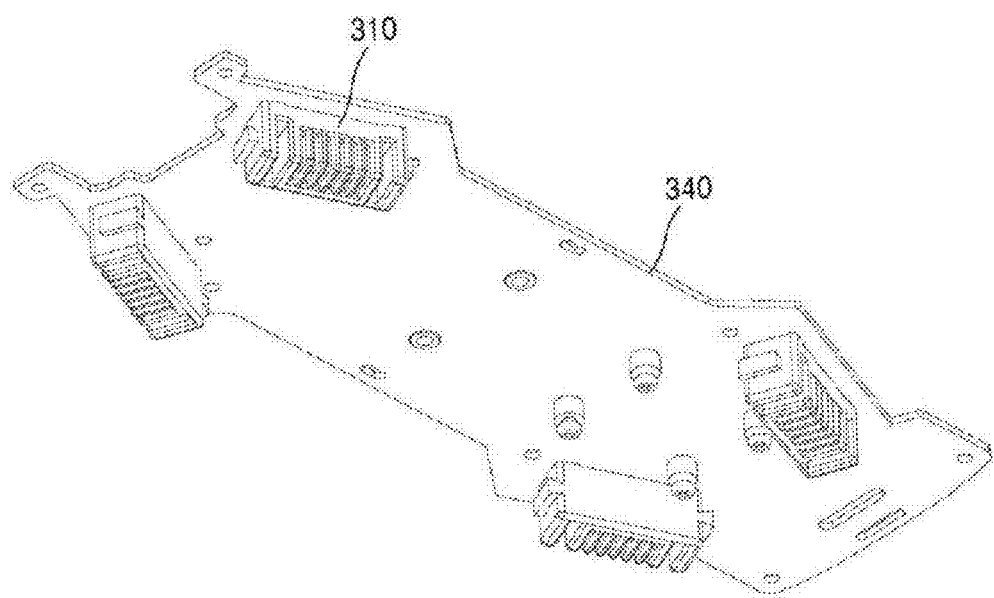
FIG. 5B illustrates a rear surface of a main control member illustrated in FIG. 5A.

FIG. 5B illustrates a rear surface of the main control member 340 illustrated in FIG. 5A. Referring to FIG. 5B, the receptacle 310 into which the plug terminal P of the arm unit 200 is inserted is provided at the edge part of the main control member 340.

In the unmanned aerial vehicle 100, when the motor 230 rotates the rotary wing 220 at high speed, vibration may be generated in the unmanned aerial vehicle 100. When the IMU sensor board 360 is not independently anti-vibration processed, a sensor generates a signal including a vibration component. When a gain value of a software filter is increased to remove the vibration, time delay is essentially generated in the sensor signal and the unmanned aerial vehicle 100 may not be able to perform enhanced flight at an accurate time. When a sensor board that is independently anti-vibration processed is used, vibration transferred to the sensor is physically reduced and the time delay of the sensor signal is reduced due to the use of software having a low filter gain. Accordingly, instant enhanced flight of the unmanned aerial vehicle 100 is possible.

The main body frame 350 is a frame to accommodate and support the main control member 340, and may further include a support side wall 351 to support the receptacle 310.

Figure 6:
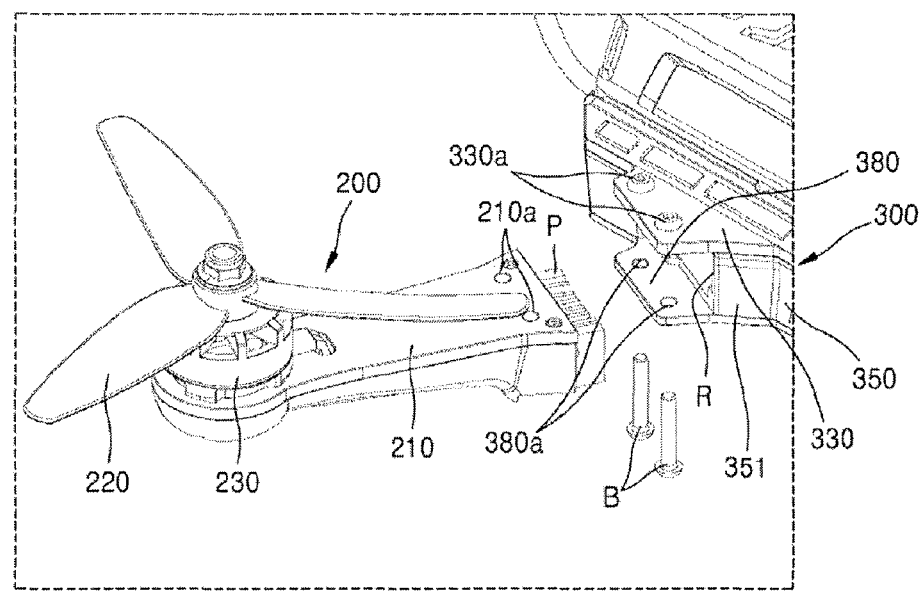
FIG. 6 is a reference view for describing coupling of the arm unit and the main body according to an embodiment.

FIG. 6 is a reference view for describing coupling of the arm unit 200 and the main body 300 according to an embodiment.

In the arm unit 200 configured as above, an opposite end portion of the arm unit 200 is configured to be detachable from the main body 300.

In detail, the arm main body 210 of the arm unit 200 is configured to be detachable from the main control member 340 of the main body 300. Referring to FIG. 5A, the main control member 340 is integrally coupled to the carbon plate 330 on a lower portion of the carbon plate 330. When the arm main body 210 is connected to the main control member 340, the plug terminal P of the arm main body 210 is inserted into the receptacle(R) 310 of the main control member 340. When the arm main body 210 is disassembled from the main control member 340, the plug terminal P of the arm main body 210 is detached from the receptacle(R) 310 of the main control member 340. Furthermore, during the insertion, to allow the arm main body 210 to be firmly connected and fixed to the main body 300, after the plug terminal P of the arm main body 210 is inserted into the receptacle(R) 310 of the main control member 340, additional fixing using a coupling bolt B is performed therebetween.

For example, from under the main body lower carbon cover 380 coupled to a lower portion of the main body frame 350, the coupling bolt B passes through a first coupling hole 380a of the main body lower carbon cover 380 and a second coupling hole 210a of the arm main body 210, and then screw-coupled to a nut portion 330a of the carbon plate 330.

Furthermore, the support side wall 351 that firmly supports both side portions of the receptacle R is formed on the main body frame 350. The support side wall 351 may prevent the plug terminal P and the receptacle R from being damaged or deformed by an external force or shock after the plug terminal P is inserted into the receptacle R. Accordingly, when the arm main body 210 is mounted on the main body 300, a firm connection and fixing state may be obtained therebetween.

Figure 7:
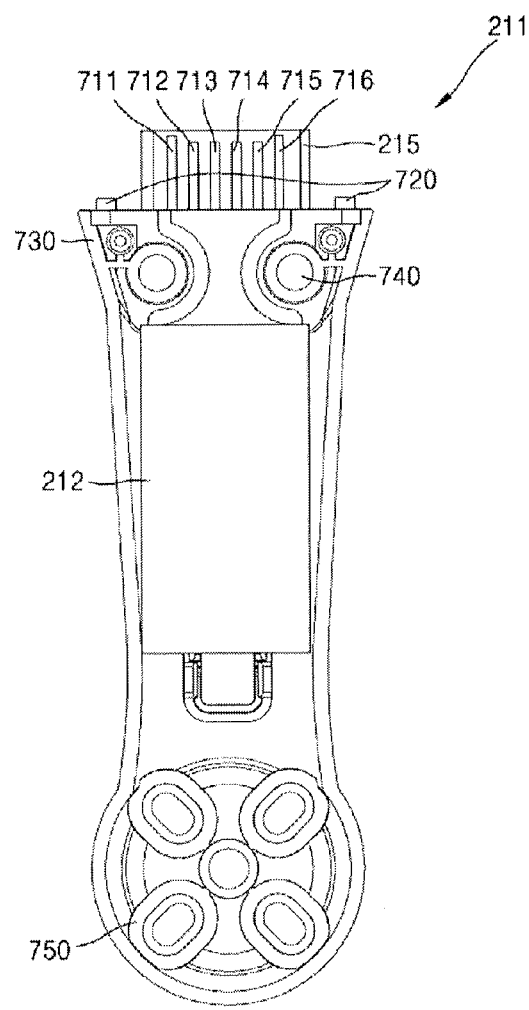
FIG. 7 is a plan view of the arm unit according to an embodiment.

FIG. 7 is a plan view of the arm lower cover 211 according to an embodiment.

Referring to FIG. 7, the arm lower cover 211 may include, at one end thereof, the connector 215 for the coupling to the receptacle R provided at the main body 300. The arm lower cover 211 may include a PCB holding bolt 720, a plastic case 730, and an arm holding nut 740. The motor 230 may be installed at an upper portion of one end 750 of the arm lower cover 211.

The plug terminal P is a connection portion of the main body 300 and the arm unit 200 detachable from the main body 300, and is located at one end portion of the arm unit 200. The plug terminal P may be configured by, for example, six pins 711, 712, 713, 714, 715, and 716. Among the six pins, four pins may be used for power and the other two pins may be used for signal transceiving.

The two pins for signal transceiving may be used for, for example, (LED color control and rotor speed control), (serial communication transmission and serial communication receiving) for serial communication, (rotor speed control and rotor speed control) for robust signal transceiving, or (CAN High and CAN Low) for CAN communication.

As such, as the motor control member 213 is arranged at the arm unit 200, a motor line connecting the motor control member 213 and the motor 230 installed on an upper portion of the one end 750 of the arm lower cover 211 is shortened so that the weight of the arm unit 200 may be reduced.

Furthermore, as the motor control member 213 is arranged at the arm unit 200 in a distributed manner, when the motor control member 213 is broken, the unmanned aerial vehicle 100 may be easily repaired by replacing only the arm unit 200 including the broken motor control member 213. When the motor control member 213 is installed at the main body 300 and the motor control member 213 is broken, the entire main body 300 needs to be replaced.

According to an embodiment, the arm unit 200 may include the motor control member 213 therein. As such, when the motor control member 213 is included in the arm unit 200, not only a motor control signal, but also control of an LED indicating a state of the unmanned aerial vehicle 100 may be controlled by a corresponding signal. By doing so, flexibility and robustness of the unmanned aerial vehicle 100 may be improved. Since the signals transferred through the connector 215 include signals not only for the control of the motor 230 of the unmanned aerial vehicle 100, but also for the control of a color of the LED, a flexible configuration is possible.

Figure 8:
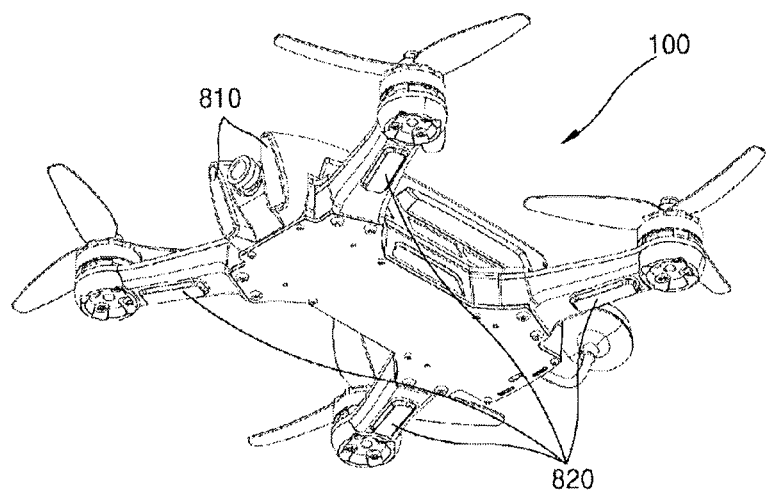
FIG. 8 is a bottom view of an unmanned aerial vehicle according to an embodiment.

FIG. 8 is a bottom view of the unmanned aerial vehicle 100 according to an embodiment.

The unmanned aerial vehicle 100 according to an embodiment may include a plurality of lighting units at a front surface of the main body 300, the arm unit 200, and a rear surface of the main body 300.

Referring to FIG. 8, the unmanned aerial vehicle 100 according to an embodiment may include a front LED 810 at the front surface of the main body 300, an arm LED 820 at the lower surface of the arm unit 200, and a back LED at the rear surface of the main body 300.

As such, the LEDs provided in the unmanned aerial vehicle 100 may indicate various states of the unmanned aerial vehicle 100.

According to an embodiment, the LEDs provided in the unmanned aerial vehicle 100 may emit light a color designated by a user to distinguish one airplane from another when a plurality of airplanes fly at the same time.

According to an embodiment, the LEDs provided in the unmanned aerial vehicle 100 may indicate a stop state or a rotation state of the motor 230.

According to an embodiment, the LEDs provided in the unmanned aerial vehicle 100 may indicate a low voltage state of a battery. For example, during the flight of the unmanned aerial vehicle 100, when a voltage of a battery is lowered so as not to maintain the flight, the LEDs may be implemented to flicker for warning.

According to an embodiment, the LEDs provided in the unmanned aerial vehicle 100 may be used to warn abnormality of an airframe of the unmanned aerial vehicle 100. For example, when no control signal is received from a remote controller or the ground is not flat for taking off, the LEDs may indicate warning by using flickering and colors of the LEDs.

According to an embodiment, the LEDs provided in the unmanned aerial vehicle 100 may indicate a remote control device connection mode. For example, when the unmanned aerial vehicle 100 and the remote control device are connected to each other, the LEDs flickering in a particular color may indicate that the unmanned aerial vehicle 100 is in a connection mode.

According to an embodiment, the LEDs provided in the unmanned aerial vehicle 100 may be implemented to indicate different states or different warnings according to the installation positions of the respective LEDs.

Figure 9A:
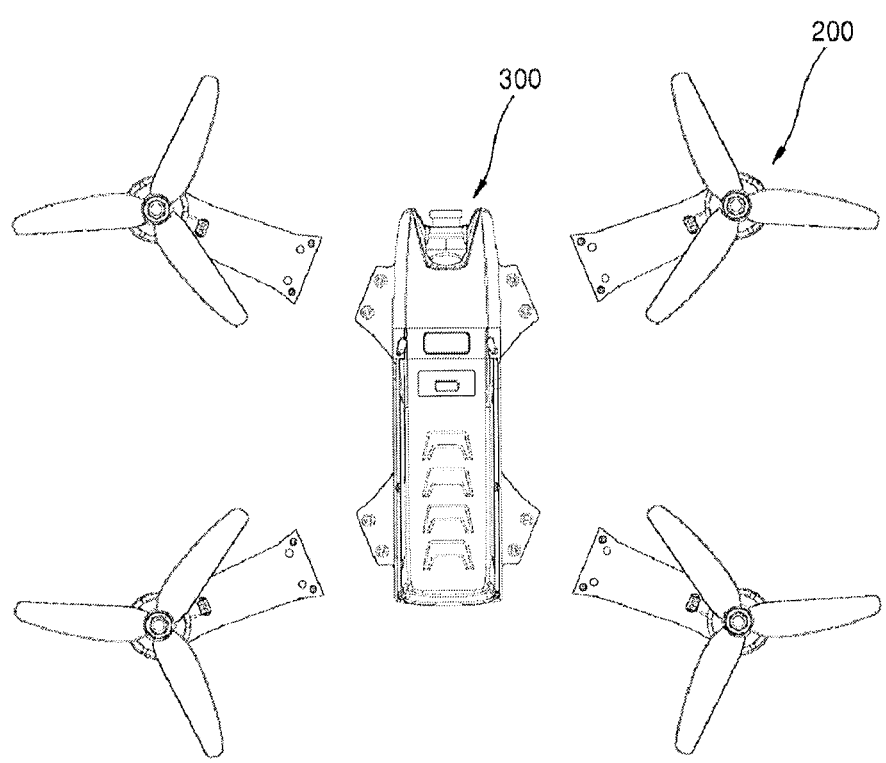
FIG. 9A is an explode view of an unmanned aerial vehicle according to an embodiment.

FIG. 9A is an explode view of the unmanned aerial vehicle 100 according to an embodiment.

Figure 9B:
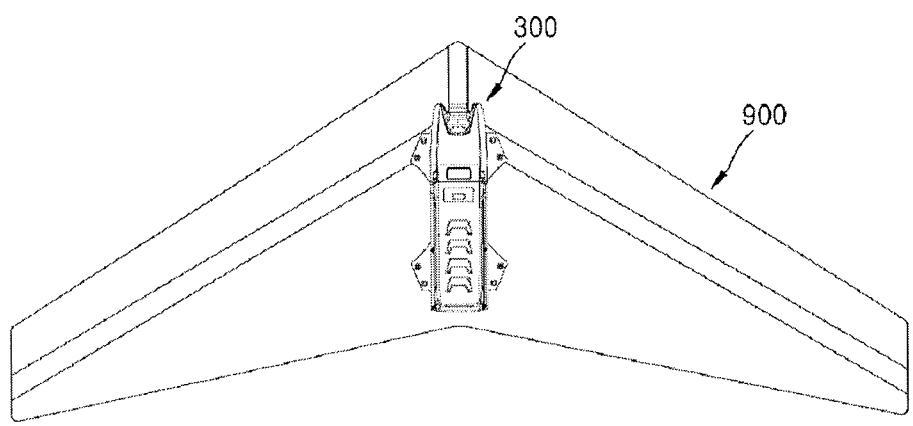
FIG. 9B illustrates an example in which an airplane wing is coupled to the main body of an unmanned aerial vehicle according to an embodiment.

FIG. 9B illustrates an example in which an airplane wing is coupled to the main body 300 of the unmanned aerial vehicle 100 according to an embodiment.

As illustrated in FIG. 9A, in the unmanned aerial vehicle 100 according to the present embodiment, since the main body 300 and the arm unit 200 are configured to be detachable, the unmanned aerial vehicle 100 according to an embodiment may be easily converted to an unmanned aerial vehicle having an airplane shape by installing a wing type airframe 900 in an airplane shape having a wing, instead of installing the arm unit 200. The wing type airframe 900 may have a shape to be insertion coupled to the main body 300, and may have a structure to be operated by receiving power and a control signal from the main body 300 of the unmanned aerial vehicle 100.

Figure 10:
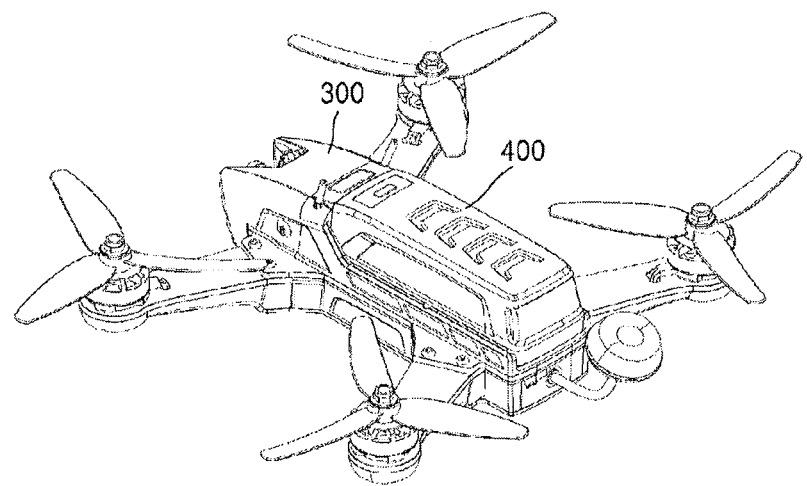
FIG. 10 illustrates a coupling state of the battery unit in an unmanned aerial vehicle according to an embodiment.

FIG. 10 illustrates a coupling state of the battery unit 400 to the main body 300 in the unmanned aerial vehicle 100 according to an embodiment.

The battery unit 400 is configured to be detachable from the main body 300. A clamping structure may be provided in each of the main body 300 and the battery unit 400 to clamp each other.

As illustrated in FIG. 10, the battery unit 400 is configured to be exposed to the outside while the battery unit 400 is coupled to the main body 300. Accordingly, since the battery unit 400 flies by being exposed to the outside without being covered by another cover, heat generated due to the operation of the battery may be effectively cooled in the unmanned aerial vehicle 100 according to an embodiment.

Figure 11:
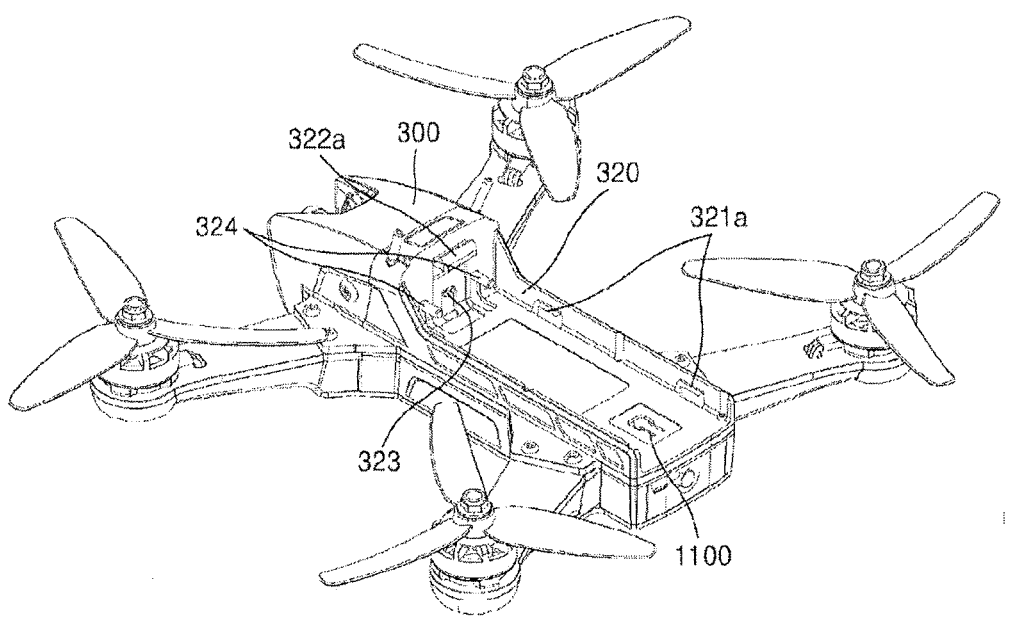
FIG. 11 illustrates a decoupled state of the battery unit in an unmanned aerial vehicle according to an embodiment.

FIG. 11 illustrates a decoupled state of the battery unit 400 in the unmanned aerial vehicle 100 according to an embodiment.

Figure 12:
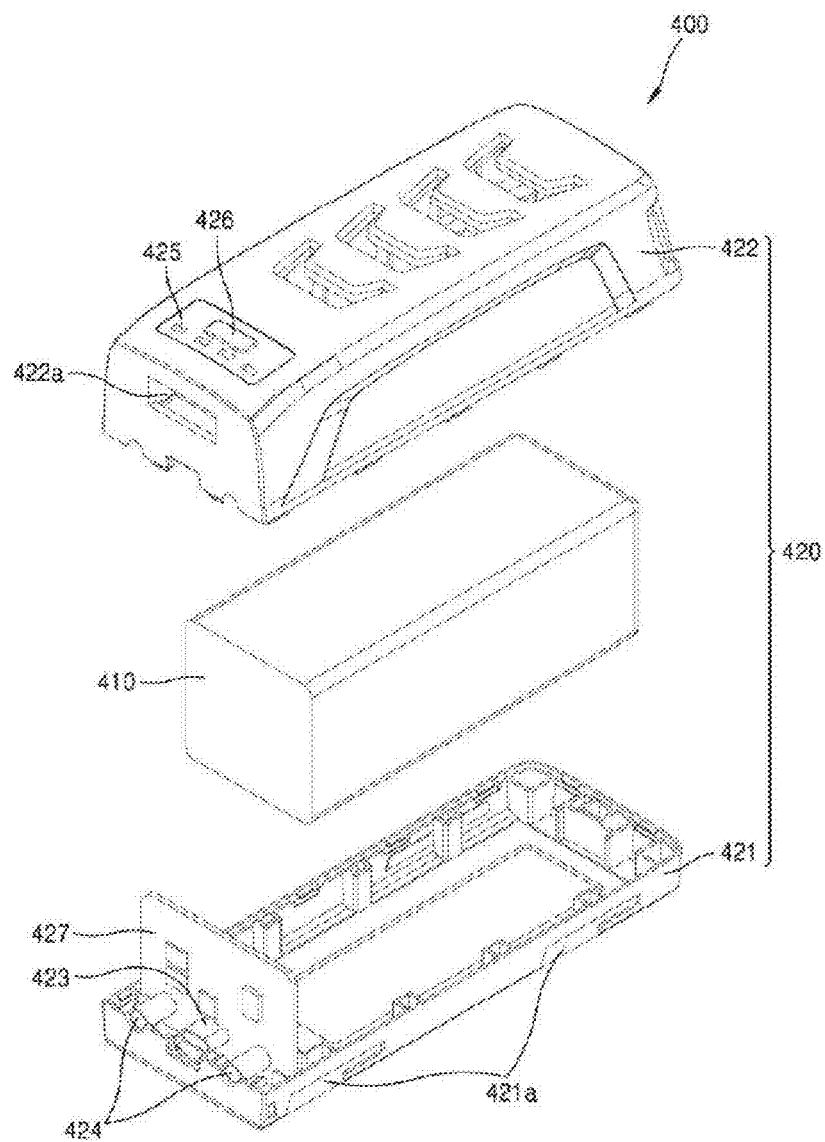
FIG. 12 illustrates a structure of the battery unit according to an embodiment.

FIG. 12 illustrates a structure of the battery unit 400 according to an embodiment.

In the following description, a structure in which the battery unit 400 is detachable from the main body 300 is described with reference to FIGS. 11 and 12.

Referring to FIG. 12, the battery unit 400 may include a battery 410 and a battery case 420.

The battery case 420 is designed to have a battery expansion allowance space in a side portion or an upper portion thereof, considering a phenomenon that the battery 410 expands during the operation of the unmanned aerial vehicle 100. Furthermore, since the battery unit 400 that generates heat during the operation of the unmanned aerial vehicle 100 is located outside the unmanned aerial vehicle 100 by being clamped thereto, during the flight of the unmanned aerial vehicle 100, the battery unit 400 is naturally cooled down by an outside air flow. The battery case 420 may have any shape if it is aerodynamically efficient and aesthetic in terms of design.

The battery case 420 may include a case housing 422 and a case bottom 421.

A horizontal clamping slot 422*a* may be formed in the case housing 422.

A vertical clamping slot 421*a* may be formed in the case bottom 421. Furthermore, a battery protection board 427 for electrically protecting the battery 410 in the battery unit 400 from being damaged during the use of the battery unit 400 may be installed on the case bottom 421. The battery protection board 427 may recognize a state of the battery 410 in real time and transmit information about the state of the battery 410 to the unmanned aerial vehicle 100 via a battery communication port 423.

A vertical clamping bar 321*a* and a horizontal clamping bar 322*a* may be formed corresponding to the above-described slots on the battery detachable bracket 320 in the main body 300.

First, a vertical clamping structure of the battery case 420 where the battery 410 is accommodated is described below.

The vertical clamping slot 421*a* of the case bottom 421 is formed at each of opposite corner portions of a lower portion of the case bottom 421, and has a shape extending upward and then bent backward, viewed from a lateral side, as illustrated in FIG. 12. The vertical clamping bar 321*a* of the battery detachable bracket 320 has a shape extending upward and then bent backward, viewed from a lateral side, as illustrated in FIG. 11. Accordingly, as the battery case 420 including the battery 410 is placed in the battery detachable bracket 320, the vertical clamping bar 321*a* of the battery detachable bracket 320 is inserted into the vertical clamping slot 421*a* of the case bottom 421. As the battery case 420 is moved forward, the vertical clamping bar 321*a* is moved relatively backward in the vertical clamping slot 421*a*. Accordingly, an arrangement structure is established, in which the vertical clamping bar 321*a* is prevented from moving vertically in the vertical clamping slot 421*a*. Accordingly, the battery case 420 that accommodates the battery 410 is in a clamping state in which the battery case 420 is placed in the battery detachable bracket 320 and a vertical movement of the battery case 420 is restricted therein.

A horizontal clamping structure of the battery case 420 that accommodates the battery 410 is described below.

The horizontal clamping slot 422*a* is formed in the case housing 422, as illustrated in FIG. 12. A hook step is formed on the horizontal clamping bar 322*a* of the battery detachable bracket 320, as illustrated in FIG. 11. An end portion of the hook step protrudes in a taper shape.

Accordingly, as the battery case 420 including the battery 410 is accommodated in battery detachable bracket 320 and moved forward, the hook step of the horizontal clamping bar 322*a* of the battery detachable bracket 320 is slidably inserted into the horizontal clamping slot 422*a* of the case housing 422 to be led into the horizontal clamping slot 422*a*. Then, as the hook step is lifted up and caught, an arrangement structure is established, in which the horizontal clamping bar 322*a* is prevented from moving backward in the horizontal clamping slot 422*a*. Accordingly, the battery case 420 that accommodates the battery 410 is in a clamping state in which the battery case 420 is placed in the battery detachable bracket 320 and is prevented from horizontally moving.

Reversely, to remove the battery case 420 from the battery detachable bracket 320, the horizontal clamping bar 322*a* is pressed to lower the hook step and then the battery case 420 is moved backward. As such, when the battery case 420 is moved backward, the vertical clamping bar 321*a* is located at a position where the vertical movement of the vertical clamping bar 321*a* is not restricted in the vertical clamping slot 421*a*, and finally, the battery case 420 is moved upward so that the removal of the battery case 420 is completed.

Due to the above-described vertical clamping structure and horizontal clamping structure, the battery unit 400 may be firmly clamped to the main body 300 and the battery unit 400 may be easily and rapidly replaced.

Furthermore, in the clamping state in which the battery case 420 that accommodates the battery 410 is placed in the battery detachable bracket 320, a power connection terminal 324 that is connected to the main control member 340 and passes through the battery detachable bracket 320 may be inserted into and connected to a power connection portion 424 of the battery 410 that is exposed as a part of the case housing 422 is open. Furthermore, a battery communication port 323 that is connected to the main control member 340 and passes through the battery detachable bracket 320 may be connected to the battery communication port 423 of the battery 410 that is exposed as a part of the battery case 420 is open.

Referring to FIG. 11, the unmanned aerial vehicle 100 according to an embodiment may include an input button 1100 that receives a user input to pair a remote control device for controlling the unmanned aerial vehicle 100 and the unmanned aerial vehicle 100 that receives a control command. The input button 1100 may be installed at a part of the main body 300 that is not exposed to the outside when the battery unit 400 is installed on the main body 300, for the safety of users. In other words, a user may press the input button 110 only when the battery unit 400 is not installed at the main body 300.

Accordingly, the motor 230 may be structurally prevented from rotating due to an incorrect control command that may be generated during the connection between the remote control device and the unmanned aerial vehicle 100. Furthermore, according to another embodiment, when no battery is installed in the unmanned aerial vehicle 100, power for electronic circuit parts, except the motor 230, may be supplied through a USB, and various parameters of the unmanned aerial vehicle 100 may be controlled via USB power.

Figure 13:
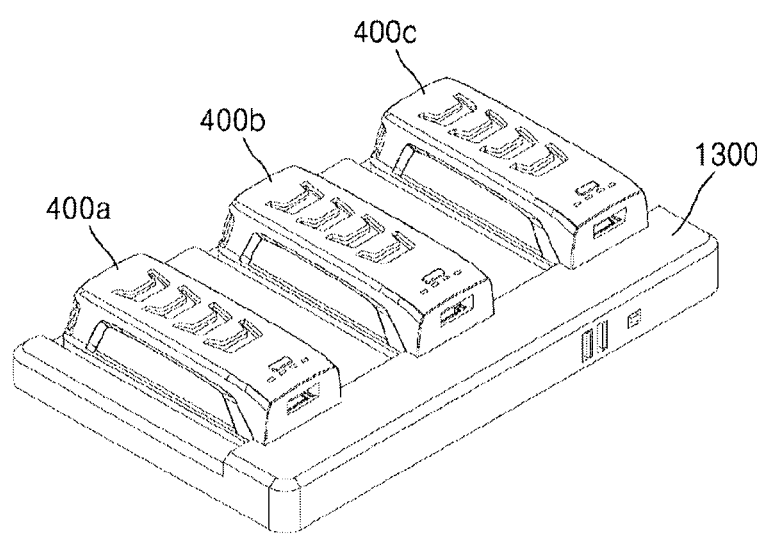
FIG. 13 illustrates a battery charger according to an embodiment.

FIG. 13 illustrates a battery charger 1300 according to an embodiment.

Referring to FIG. 13, the battery charger 1300 may charge a plurality of battery units 400a, 400b, and 400c. Although in FIG. 13 the battery charger 1300 is configured to charge three batteries, the present disclosure is not limited thereto and the battery charger 1300 may be configured to charge one or more batteries.

Figure 14:
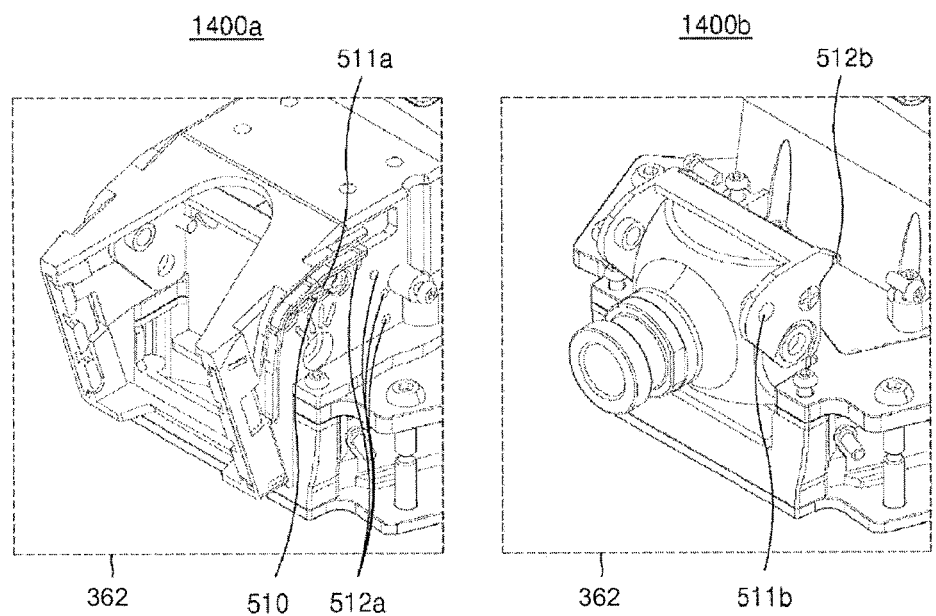
FIG. 14 illustrates a camera installation member provided in the main body of the unmanned aerial vehicle according to an embodiment.

FIG. 14 illustrates a camera installation member provided in the main body 300 of the unmanned aerial vehicle 100 according to an embodiment.

Referring to FIG. 14, an angle adjustment member 362 may adjust an angle of the camera unit 500 installed in the front surface of the main body 300 and thus a user may easily change the angle of the camera unit 500 by using screw-shaped adjustment portions 511a and 511b and latch-shaped adjustment portions 512a and 512b.

The latch-shaped adjustment portions 512a and 512b may support the camera unit 500 not to move at a preset angle of the camera unit 500, and the user may firmly fix the camera unit 500 by using the screw-shaped adjustment portions 511a and 511b. In other words, the user may locate the latch-shaped adjustment portion 512b at any one of a plurality of holes that is the latch-shaped adjustment portion 512a, and may screw-couple the screw-shaped adjustment portion 511b at the screw-shaped adjustment portion 511a. As such, since the angle of the camera unit 500 is mechanically fixed by the screw-shaped adjustment portions 511a and 511b, the angle of the camera unit 500 is not changed by an external shock.

The unmanned aerial vehicle 100 according to an embodiment may have a structure to effectively cool the heat of the battery 410.

Figure 15:
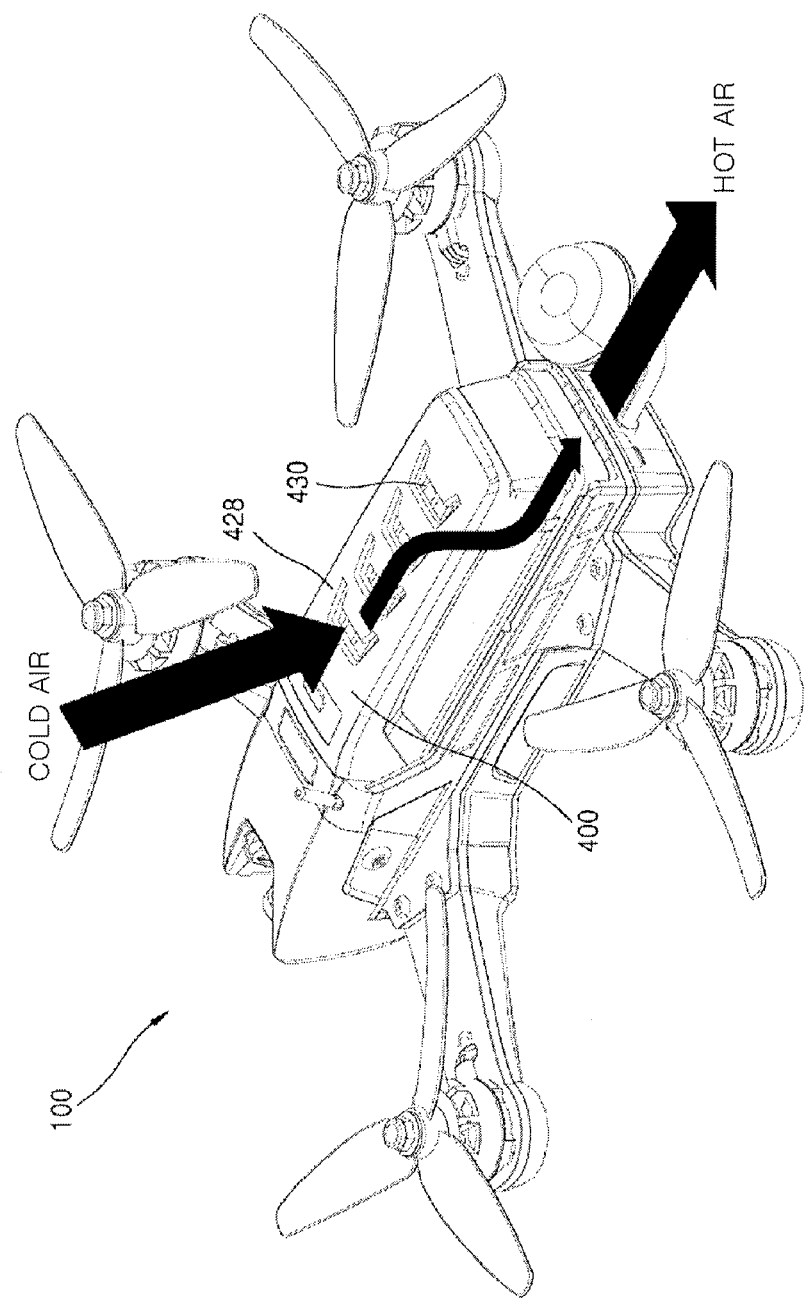
FIG. 15 illustrates a structure of effectively cooling heat of a battery of the unmanned aerial vehicle according to an embodiment.

FIG. 15 illustrates a structure of effectively cooling the heat of the battery 410 of the unmanned aerial vehicle 100 according to an embodiment.

Referring to FIG. 15, during the flight of the unmanned aerial vehicle 100 according to an embodiment, cold air coming from the front side of the unmanned aerial vehicle 100 may flow into the inside of the battery unit 400 through an air inlet hole 428 provided in the battery unit 400 and pass through a ventilation slit 430 provided in the battery unit 400, thereby absorbing the heat radiated from the battery 410.

The hot air due to the absorption of the heat radiated from the battery 410 may be discharged to the outside of the unmanned aerial vehicle 100 though a ventilation manifold provided in the main body 300. As such, the heat problem of the battery 410 of the unmanned aerial vehicle 100 may be effectively solved by the above-described structure in which the battery 410 is cooled by using the cold air flowing in from the outside of the battery unit 400 and the hot air due to the cooling of the battery 410 is discharged to the outside of the unmanned aerial vehicle 100.

The structure of the unmanned aerial vehicle 100 that may effectively solve the heat problem of the battery 410 as described in FIG. 15 is described below with reference to FIG. 16.

Figure 16:
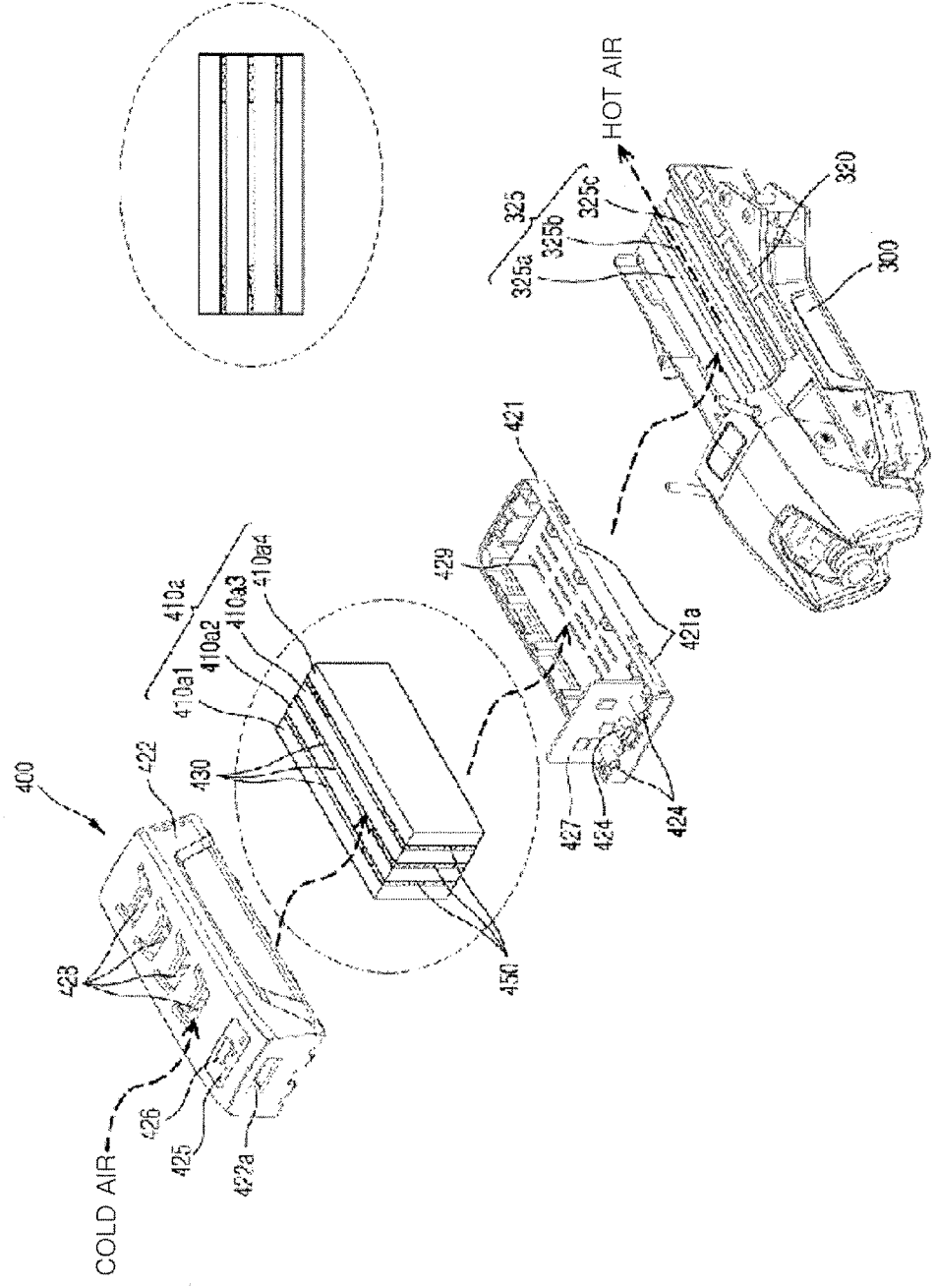
FIG. 16 illustrates a structure of the battery unit and the main body capable of effectively cooling heat of a battery of the unmanned aerial vehicle according to an embodiment.

FIG. 16 illustrates a structure of the battery unit 400 and the main body 300 capable of effectively cooling the heat of the battery 410 of the unmanned aerial vehicle 100 according to an embodiment.

Referring to FIG. 16, the case housing 422 forming the battery case 420 may include one or more air inlet holes 428 in a surface that is exposed to the outside when the battery case 420 is coupled to the main body 300 of the unmanned aerial vehicle 100. Cold air coming in a front direction of the unmanned aerial vehicle 100 may flow in through the air inlet hole 428 during the flight of the unmanned aerial vehicle 100.

According to an embodiment, the battery 410a may include two or more battery cells and a ventilation slit may be provided between the battery cells. Referring to FIG. 16, the battery 410a may include four battery cells 410a1, 410a2, 410a3, and 410a4, and an adhesive member 450 may be provided at an end portion between the battery cells. In general, in order to make a battery pack as thin as possible, an adhesive member adhering the battery cells constituting a battery pack is formed as thin as possible. In the present inventive concept, however, the adhesive member is intentionally formed to be relatively thick and thus a slit may be formed between the battery cells. Accordingly, a portion other than a portion filled with the adhesive member 450 between the battery cells may form the ventilation slit 430. The air passing through the air inlet holes 428 provided in the case housing 422 may pass through the ventilation slit 430 of the battery 410a.

The air passing through the ventilation slit 430 may cool the heat radiated from the battery cell.

According to an embodiment, the case bottom 421 may include one or more ventilation holes 429. Accordingly, the air passing through the ventilation slit 430 of the battery 410a may pass through the ventilation holes 429 of the case bottom 421.

According to an embodiment, one or more ventilation manifolds 325 may be provided on a surface contacting the battery unit 400 in the battery detachable bracket 320 forming the main body 300.

The ventilation manifolds 325 may include one or more passes 325A, 325B, and 325c through which the air passing through the ventilation holes 429 of the case bottom 421 is discharged to the outside.

Figure 17:
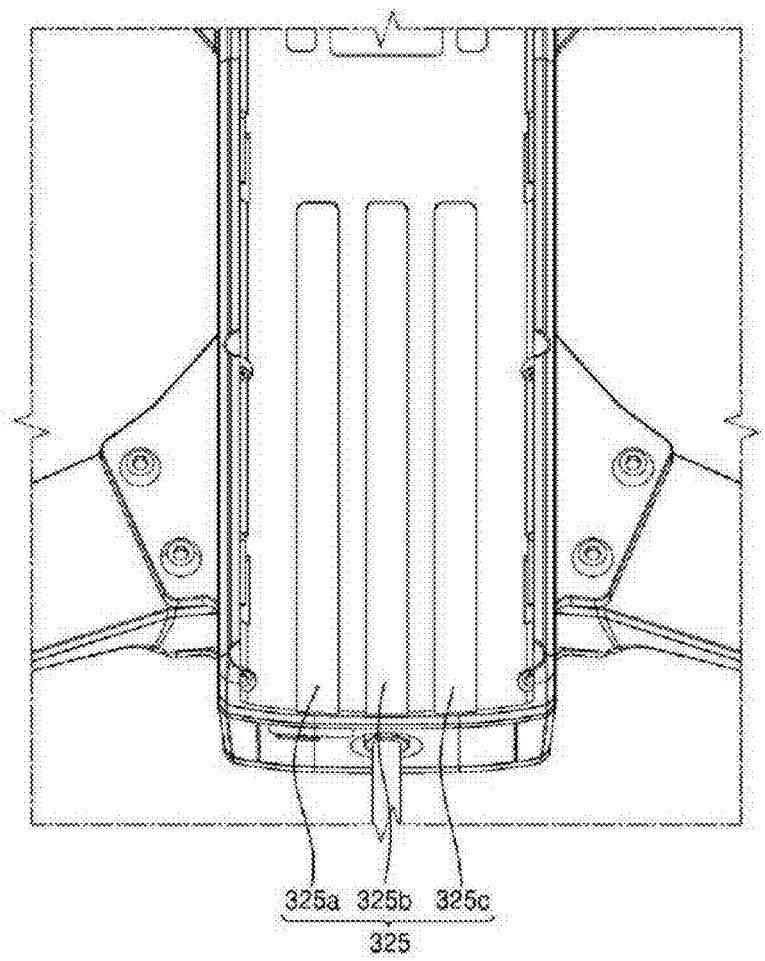
FIG. 17 illustrates a battery detachable bracket having a ventilation manifold installed thereon.

FIG. 17 illustrates the battery detachable bracket 320 having the ventilation manifold 325 installed thereon. Although FIG. 17 illustrates that the ventilation manifold 325 includes three passes 325a, 325b, and 325c, the present disclosure is not limited thereto, and various numbers of passes may be provided. When the passes of the ventilation manifold 325 match the array of the ventilation holes 429 of the case bottom 421, cooling effect may be further enhanced.

FIG. 18 illustrates a rear side of the main body 300 of the unmanned aerial vehicle 100 to which the battery unit 400 is coupled. Referring to FIG. 18, an air outlet hole 326 may be formed between the battery unit 400 and the battery detachable bracket 320 by the ventilation manifold 325 provided in the battery detachable bracket 320.

As such, as the air passing through the air inlet hole 428 of the case housing 422 of the battery unit 400 is discharge to the outside of the unmanned aerial vehicle 100 via the ventilation slit 430 of the battery 410a, the ventilation holes 429 of the case bottom 421, and the ventilation manifold 325 of the battery detachable bracket 320, the heat of the battery 410 may be effectively cooled.

In the above descriptions, the present inventive concept has been particularly shown and described with reference to embodiments thereof.

However, it will be understood by those skilled in the art that various changes in form and details may be made therein without departing from the spirit and scope of the inventive concept as defined by the appended claims. The embodiments should be considered in descriptive sense only and not for purposes of limitation. Therefore, the scope of the inventive concept is defined not by the detailed description of the inventive concept but by the appended claims, and all differences within the scope will be construed as being included in the present inventive concept.

The invention claimed is:

1. An unmanned aerial vehicle comprising:
a plurality of arm units, each of the plurality of arm units comprising a rotary wing, a motor, and an arm main body and detachably coupled to a main body;
the main body comprising a plurality of receptacles for coupling to the plurality of arm units; and
a battery unit detachably coupled to the main body to be exposed to outside, wherein at least a part of the battery unit is exposed to outside when the battery unit is coupled to the main body,
wherein the battery unit comprises a battery and a battery case having at least one air inlet hole in the at least part exposed to the outside.

2. The unmanned aerial vehicle of claim 1, wherein the main body comprises a main control member receiving a signal transmitted from an external controlling device and controlling the unmanned aerial vehicle, and
each of the plurality of arm units comprises a motor control member receiving a control signal from the main control member and controlling a speed of the motor.

3. The unmanned aerial vehicle of claim 2, wherein each of the plurality of arm units comprises a connector electrically and mechanically coupled to the receptacle of the main body, and
the motor control member receives the control signal from the main control member via the connector.

4. The unmanned aerial vehicle of claim 1, wherein the arm main body comprises:
an arm lower cover transceiving a signal with respect to the main body, having a connector installed thereon, and transferring the signal to a motor control member;
the motor control member installed on the arm lower cover and controlling a speed of the motor; and
an arm upper cover coupled to the arm lower cover where the motor control member is installed, wherein the motor and the rotary wing are installed on the arm upper cover.

5. The unmanned aerial vehicle of claim 4, wherein the arm upper cover is configured to dissipate heat from the motor control member.

6. The unmanned aerial vehicle of claim 1, wherein the battery unit comprises a battery and a battery case, and
the battery case comprises a clamping slot, the main body comprises a clamping bar coupled to the clamping slot, and when the main body and the battery case are coupled to each other, the clamping slot and the clamping bar are coupled to each other.

7. The unmanned aerial vehicle of claim 1, wherein an input button for connection between the unmanned aerial vehicle and an external controlling device is installed in a part of the main body that is not exposed to outside when the main body and the battery unit are coupled to each other.

8. The unmanned aerial vehicle of claim 7, wherein the input button is provided on one surface of the main body contacting the battery unit, and the unmanned aerial vehicle receives a control command from the external controlling device by a user's input through the input button.

9. The unmanned aerial vehicle of claim 1, wherein a camera installation member for installing a camera is provided on the main body, and
the camera installation member comprises a plurality of holes to adjust an installation angle of the camera.

10. The unmanned aerial vehicle of claim 1, wherein the battery comprises two or more battery cells, and a ventilation slit is provided between the battery cells to pass air coming through the at least one air inlet hole provided in the battery case.

11. The unmanned aerial vehicle of claim 10, wherein the battery case comprises:
a case housing having the at least one air inlet hole; and
a case bottom having at least one ventilation hole for discharging the air passing through the at least one air inlet hole and the ventilation slit of the battery to outside of the battery case.

12. The unmanned aerial vehicle of claim 11, wherein the ventilation hole is provided in plural numbers, and
each of the ventilation holes is provided in a bottom of the battery case corresponding to an arrangement of the ventilation slit.

13. The unmanned aerial vehicle of claim 11, wherein a ventilation manifold having one or more paths, through which air passing through the ventilation hole provided in the case bottom is discharged to outside of the unmanned aerial vehicle, is provided on a surface of the main body contacting the case bottom when the battery unit is coupled to the main body.

14. The unmanned aerial vehicle of claim 13, wherein the ventilation manifold is provided in the main body corresponding to an arrangement of the ventilation hole.

* * * * *